(12) United States Patent
Dutta et al.

(10) Patent No.: US 6,433,732 B1
(45) Date of Patent: Aug. 13, 2002

(54) PACKAGE TRACKING SYSTEM

(75) Inventors: Rabindranath Dutta; Janani Janakiraman, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/823,378

(22) Filed: Mar. 30, 2001

(51) Int. Cl.⁷ ............................. G01S 5/02; H04B 7/185
(52) U.S. Cl. ................................. 342/357.07
(58) Field of Search ................ 342/357.07, 357.09, 342/357.13, 451, 457; 455/456, 457; 235/375, 384, 385; 705/28, 26, 27, 29

(56) References Cited

U.S. PATENT DOCUMENTS

| | | | |
|---|---|---|---|
| 5,669,061 A | | 9/1997 | Schipper ..................... 455/429 |
| 5,869,819 A | * | 2/1999 | Knowles et al. ............ 235/375 |
| 5,895,436 A | | 4/1999 | Savoie et al. ............... 701/214 |
| 5,918,180 A | | 6/1999 | Dimino ....................... 455/456 |
| 6,206,282 B1 | * | 3/2001 | Hayes, Sr. et al. .......... 235/375 |

* cited by examiner

Primary Examiner—Thomas H. Tarcza
Assistant Examiner—Fred H Mull
(74) Attorney, Agent, or Firm—Robert V. Wilder; Leslie A. Van Leeuwen

(57) ABSTRACT

A method and implementing system are provided in which the packaging for an item being shipped includes an item locator device for locating the item during shipment. The locator device is able to determine the location of the item being shipped through a Global Positioning System (GPS) or through another location-determining system such as a wireless telephone network. In an example, a sender maintains a database at the sender's server containing information concerning each shipping transaction. A requester is enabled to log-on to a sender's website and access the database to determine the last location and time of query for the item being shipped. The requester may access the sender's database directly for the requested location information or initiate a call from the sender to the item being shipped to update the sender's database at the time of the call. In another embodiment, a requester is able to call the item locator device directly for the location information.

24 Claims, 6 Drawing Sheets

| TRACKING# | CELL# | ORIGIN | DESTINATION | LAST LOCATION | LAST TIME CHECKED | |
|---|---|---|---|---|---|---|
| 100011 | 111-1001 | PHILA | ST. LOUIS | CHICAGO GG-51 | 3/1/01 | 1400 |
| 100012 | 111-1002 | ST. LOUIS | PHILA | MEMPHIS A-45 | 3/1/01 | 1000 |
| 100013 | 111-1003 | AUSTIN | SAN JOSE | SAN JOSE C-29 | 2/28/01 | 1700 |
| 100014 | 111-1004 | SAN JOSE | AUSTIN | SFO D-15 | 3/2/01 | 1900 |

PACKAGE TRACKING SYSTEM

RELATED APPLICATIONS

Subject matter disclosed and not claimed herein is disclosed and claimed in related co-pending application, application Ser. No. 09/240444, which is assigned to the assignee of the present application and included herein by reference.

FIELD OF THE INVENTION

The present invention relates generally to information processing systems and more particularly to a methodology and implementation for locating objects being shipped between locations.

BACKGROUND OF THE INVENTION

The shipping industry has experienced rapid growth in recent years. Much of the increased business is related to the business of the Internet and the ability to order items from websites using the Internet and having the ordered items delivered directly to the buyer's home. Many of the items ordered are quite expensive and the value of the items may exceed several thousand dollars, especially for computer systems, monitors and subsystems. In addition to large articles, important documents are also being shipped door-to-door as a standard method of shipping to insure timely and expedient delivery. With such shipments, it is both useful and important to be able to track the shipped article and be able to locate the article at any point during its journey from a sender to a receiver. As used herein, the terms "shipper" and "sender" are used interchangeably and refer to any entity sending, or contracting to send, an item from one location to another.

In the past, shipping companies have been able to track such merchandise to some extent. For example, a customer may know if the merchandise has been picked-up from the sender's location, or whether the shipped merchandise has arrived at a warehouse at the receiver's location. Generally, however, there has been no way to accurately know the precise location of shipped merchandise at points in-between origin and destination locations. Such tracking systems usually always require the input of data by a sender's agent in order to be able to track items being sent. For example, articles may have a bar code which may be scanned as items are logged into various locations along the way.

Thus there is a need for an improved tracking methodology which enables an interested party to determine a precise location of an article being sent at any point along the route from a sender to a receiver.

SUMMARY OF THE INVENTION

A method and implementing system are provided in which an item being sent from a sender to a receiver includes an item locator device for locating the item during transit. In an exemplary embodiment, the item locator device includes a wireless telephone function coupled to an item location function. The location function is able to determine the location of the item being sent through a Global Positioning System (GPS) or through another location-determining system such as a wireless telephone network. The telephone portion of the locator device, is operable to return location information to a requester when the locator device telephone circuitry is called by the requester. In an example, a sender maintains a database at the sender's server containing information concerning each shipping transaction. A requester is enabled to log-on to a sender's website and access the database to determine the last location and time of query for the item being shipped. The requester may access the sender's database directly for the requested location information or initiate a call from the sender to the item being shipped to update the sender's database at the time of the call. In another embodiment, a requester is able to call the item locator device directly for the location information.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer-related system which may include a workstation or personal computer. For example, the sender of an item being shipped may implement a server system and a customer or other requester may access the sender's server with a personal computer through an interconnection network such as the Internet. In general, an implementing computer system may include a plurality of processors in a multi-bus system in a network of similar systems. However, since the workstation or computer system used in practicing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
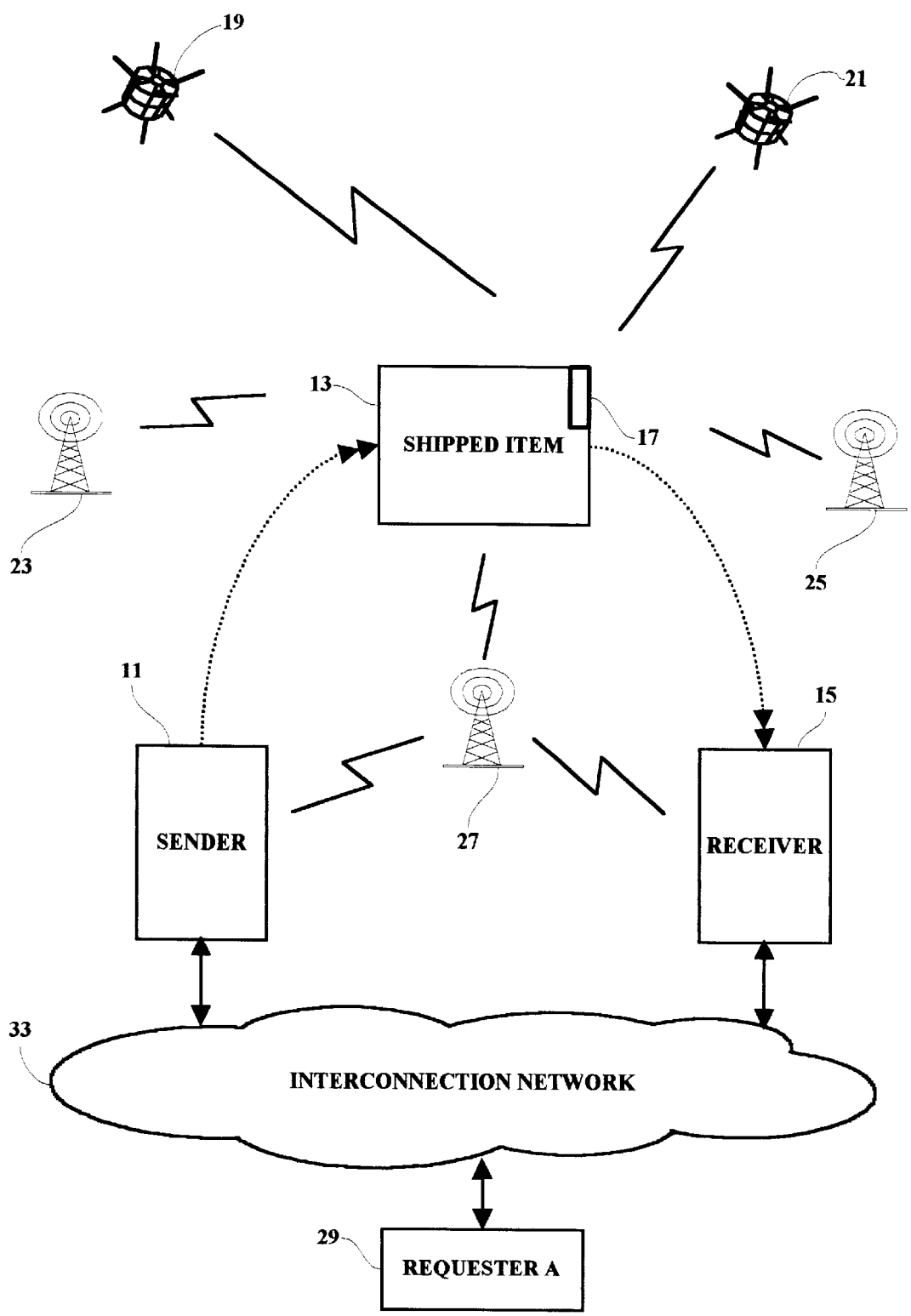
FIG. 1 is an illustration of a global environment in which the present invention may be implemented.

In FIG. 1, there is shown an illustration of a global environment in which the present invention may be implemented. As shown, a shipped item 13 is being shipped from a sender 11 to a receiver 15. The receiver 15 may be an agent of the sender, an interested third party or the ultimate receiver of the item being shipped. The item being shipped 13 is shown to include a locator compartment 17 which is used in the exemplary embodiment to contain a locator device within. The locator device in the compartment 17 is able to determine the device's position at any time by reference to a GPS system, including GPS satellites 19 and 21, or by reference to a wireless phone system which may include, for example, wireless towers 23, 25 and 27. Also shown in FIG. 1 is an interconnection network 33 such as the Internet, and a requester A 29 which may be any party interested in the progress of the shipment from the sender 11 to the receiver 15. As illustrated, the requester is in communication with the sender site 11 and may also be coupled to the receiver site 15. The requester 29 may be using a personal computer or merely a wireless Internet device in communicating with the sender 11 or the receiver 15 through the network 33.

In an exemplary operation, a requester is enable to communicate with the sender site 11 and initiate, for example, a communication with the locator device on the shipped item 13. The location information is transmitted from the shipped item 13 back to the sender's server 11 where it may be accessed by the requester. The location database may be stored both at the sender site 11 with a copy of the database at the receiver site 15. In an alternate operation, the requester A 29 may directly access the locator device on the shipped item through a wireless phone system for example, and receive location information directly from the shipped item 13 without involving the sender 11 or the receiver 15.

Figures 2, 3:
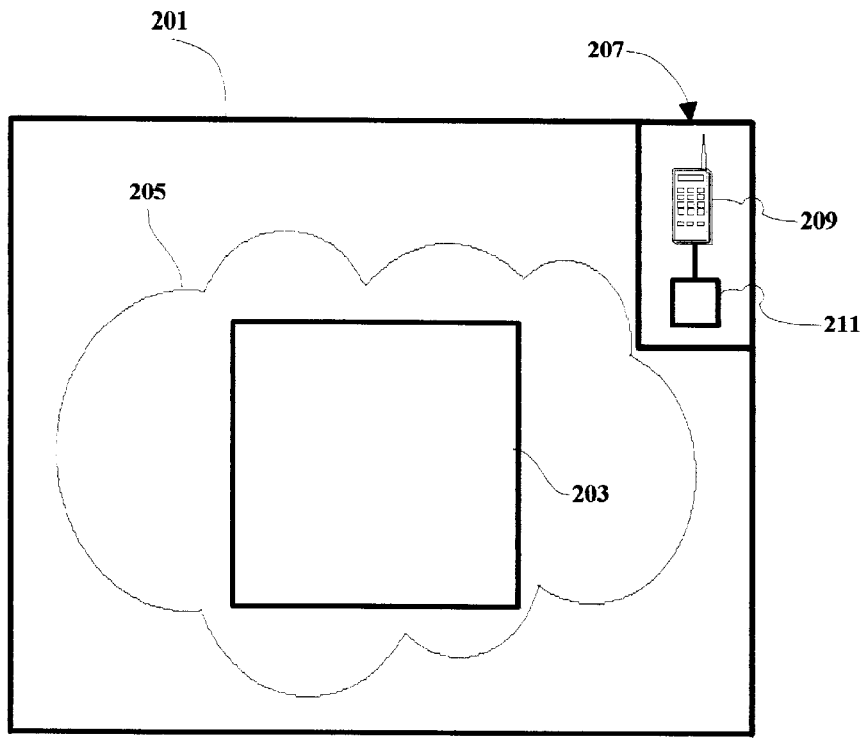
FIG. 2 is a simplified schematic diagram showing a shipping container including a container locator compartment.
FIG. 3 is an exemplary illustration of an exemplary database which is maintained by a sender's site.

FIG. 2 is a simplified schematic diagram showing a shipping container 201 including a container locator compartment 207. An article being shipped 203 is contained within packing material 205. The locator compartment 207 is arranged to securely house a locator device which includes a location-determining device 211 and a wireless telephone 209 which is shown schematically in the drawing. It is noted that the phone portion of the locator device may actually be a standard cell phone or it may be one or more integrated circuits or chips which provide the telephonic functions performed in connection with the present invention.

FIG. 3 is an illustration of an exemplary database which is maintained by a sender site 11. As shown, the database contains a tracking number for each article being shipped. Also shown is a cell phone number associated with each item together with the point of origin, the destination, the last location and the time and date that the last location was determined. The location field may, for example, contain the location in terms of a city as well as more precise map coordinates such as "GG-51" etc., which may be used to determine location in more detailed terms such as the nearest street intersection within the designated city. Such detailed information is selectively provided by the locator device within the item being shipped, and is selectively accessed by the requester A 29 or other interested party who is informed of the cell phone number of the locator device.

Figure 4:
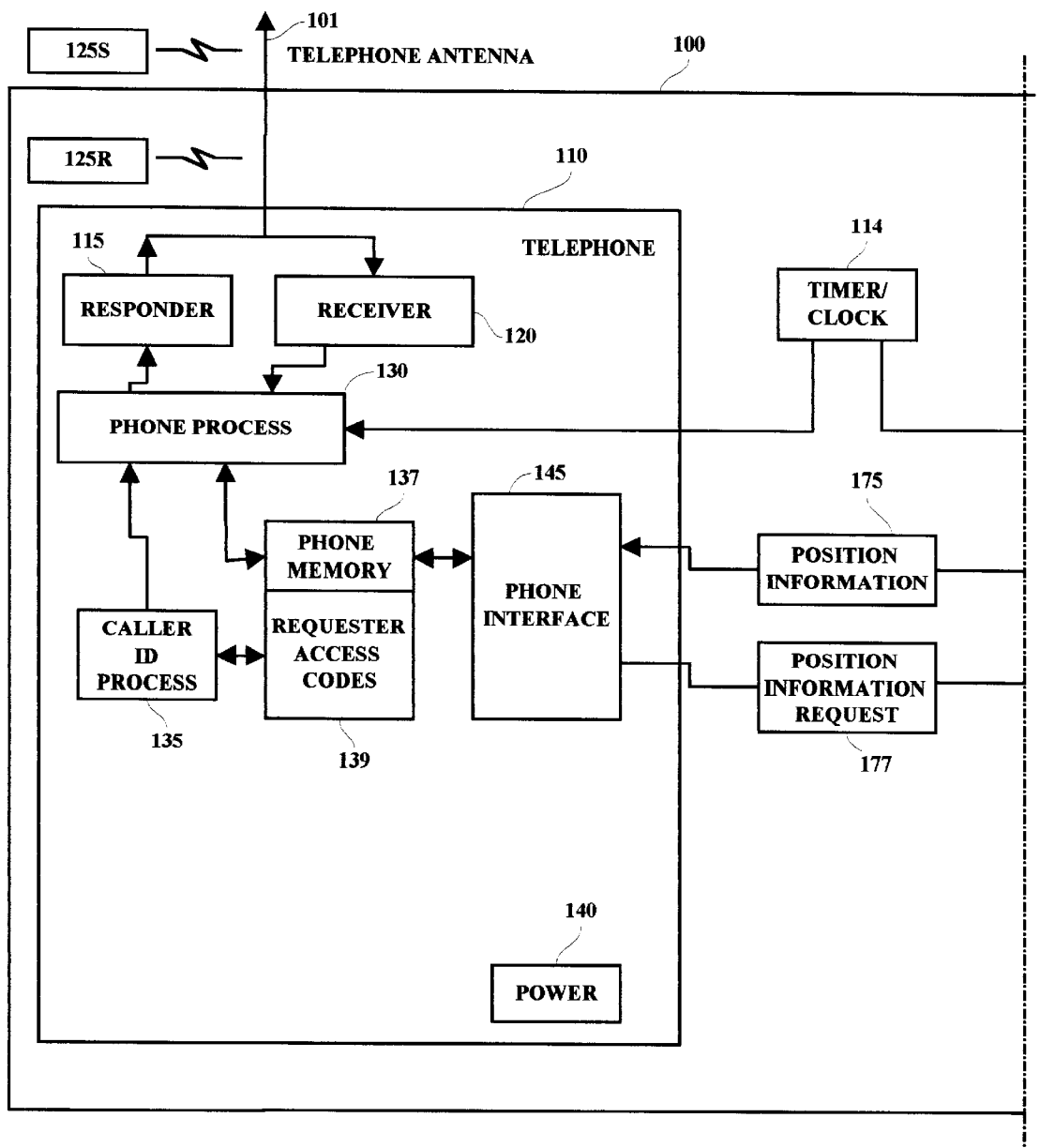
FIG. 4 is a schematic block diagram illustrating an exemplary phone portion of a container locator device.
Figure 5:
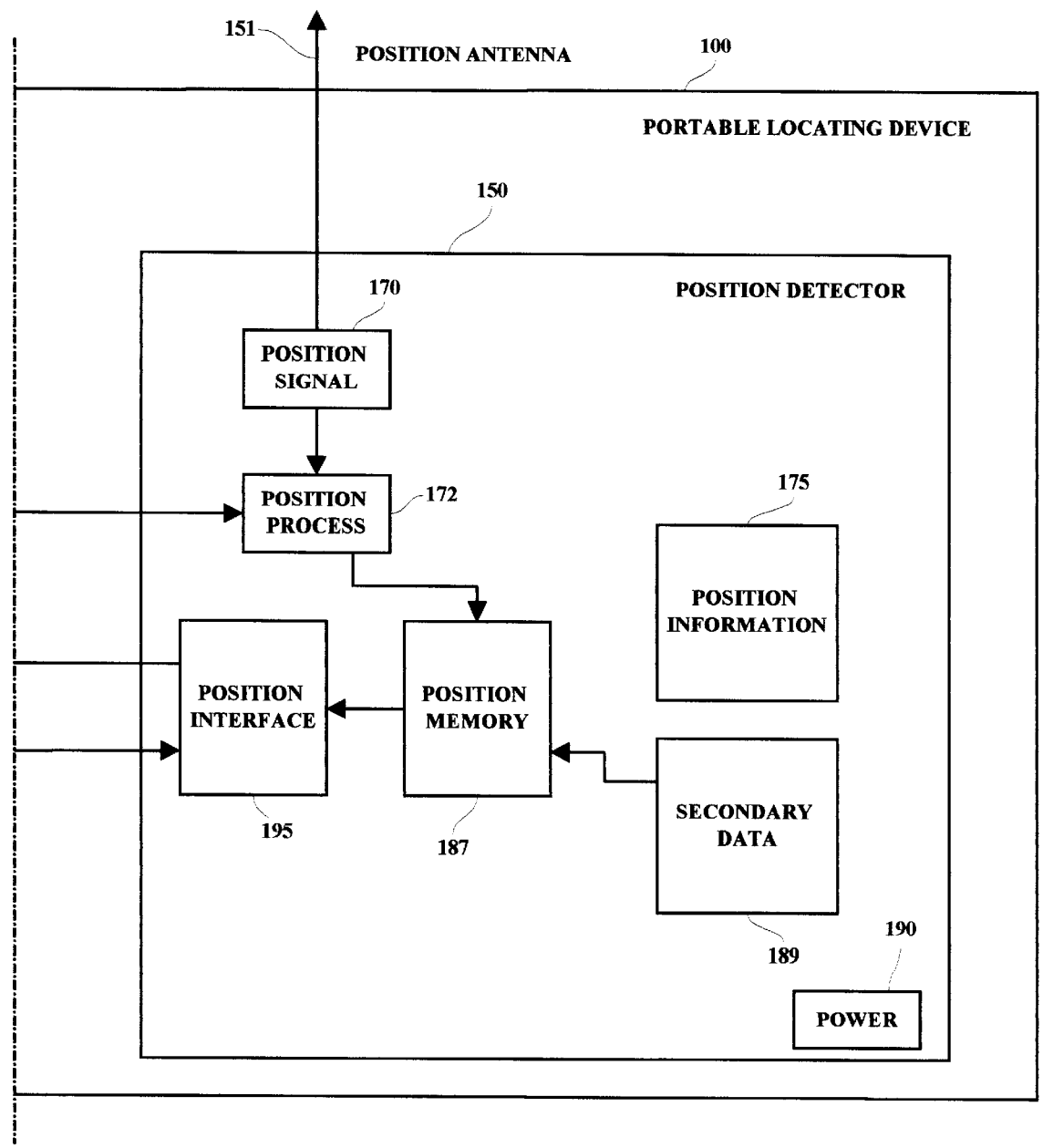
FIG. 5 is a schematic block diagram illustrating an exemplary position locator portion of a container locator device.

FIG. 4 is a schematic block diagram illustrating an exemplary phone portion of a container portable locator device 100. The device 100 comprises a telephone 110 and a position or location detector 150 (FIG. 5). The position detector 150 determines the position of the device 100 and provides that position information 175 to the telephone 110. The telephone then sends the position information 175 on a sent signal 125S through a telephone responder section 115 and a telephone network to a requester 29. In a preferred embodiment, the telephone 110 is capable of sending the sent signal 125S over a "free space" or wireless connection to the public telephone system which is sometimes referred to as the Public Switch Telephone Network (PSTN). Cellular telephones and networks are well known in the art. The telephone 110 can be any of those types of telephone handsets with certain additional features as hereinafter described. In one preferred embodiment, a phone system called "Iridium" may be used. That particular system uses Iridium satellites to provide a reliable dial-tone to Iridium handsets anywhere in the world. Other communication networks may also be used in various implementations of the present invention.

The telephone 110 has a standard power function 140, i.e. a battery, to power the memory 137 and access code section 139 of the telephone. The telephone 110 will send telephone signals 125S through a telephone responder 115 to a telephone antenna 101. The telephone is arranged to receive phone signals 125R through antenna 101. The signals 125R will be processed by the telephone receiver 120. Optionally, the telephone will have a known caller ID process 135 that will identify a requester making a request of the device 100, e.g. by providing the telephone number of the requester.

The telephone 110 has an interface 145 that performs the function of receiving position information 175 from the position detector 150. As required, the position information 175 will be stored in phone memory 137 where it is accessed by a phone process 130 which transfers the position information 175 to the telephone responder 115. The responder 115 sends the position information 175 on the sent signal 125S to the requester which may be the sender 11, the receiver 15, the requester A 29 or any other interested party calling the locator cell phone. In other embodiments, the phone process 130 is a simple memory 137 access similar to a memory read function.

The phone process may also perform other functions. For example, in one embodiment the phone process determines the requester identification from the call ID process 135. The process 130 then determines that the requester is listed in a requester access code memory 139 before the position information 175 is returned to the requester in the sent signal 125S. In another embodiment, the phone process 130 monitors a clock and/or timer signal and causes the position information 175 to be accessed by a position information request 177 from the position detector 150 and sends the position information 175 on a sent signal 125S at predetermined times of the clock and/or at predetermined intervals of the timer 114, e.g. periodically every 10 minutes. In another embodiment, the process determines that a request has been received on the received signal 125R through the telephone antenna 101 and the receiver 120 and causes the position information 175 to be sent on the signal 125S in response to the request.

FIG. 5 is a schematic block diagram illustrating an exemplary position locator portion of the locator device 100. The position detector 150 is any known device capable of determining its position on the small planet Earth. This includes GPS systems as well as cellular and other location determining systems. In a preferred embodiment, the position device 150 is a GPS position detection device that is capable of determining the position of the portable location device 100. The position detector 150 has a position antenna 151 that receives position signals 170 from satellites, such as satellites 19 and 21 in the GPS. A position process uses the position signals 170 to determine the actual position of the portable locating device 100, i.e. the position information 175. The position detector 150 has a power source 190, e.g. a battery, that may or may not be the same as the telephone power source 140.

The position detector 150 includes a position interface 195 that provides the position information to the telephone 110. Optionally, the position interface 195 can receive position information requests 177 from the telephone 110. A position memory 187 is provided as required to store the position information 175. Optional secondary data 189 about the portable locating device 100 or person and/or object associated with the device 100 can also be provided in a secondary memory 189.

The phone interface 145 and/or position interface 195 may also be separate as shown or be a common interface. Such interfaces are well known and examples of such interfaces 145 and 195 include direct memory access interfaces, general phone modems, and RS-232 interfaces. Other examples include PCMCIA cards or PC cards that are available in various types. Some receive an RJ11 phone line connection and others are especially made for cellular or other wireless phones. Other interfaces that can convert the position information 175, e.g. an ASCII or other binary representation, into a format that can be communicated by a telephone, e.g. tone signals, are also included within the scope of the disclosed implementation.

It is noted that the timer clock 114, the phone memory 137, the requester access code memory 139, the position memory 187, the secondary data memory 189, the power 140 and any other logic circuits, central processing units and system memory can reside solely in the telephone system 110, solely in the position detector 150, outside the telephone 110 and the position detector 150, or be independent of the telephone 110 and the position detector 150 as determined by a given design choice.

Figure 6:
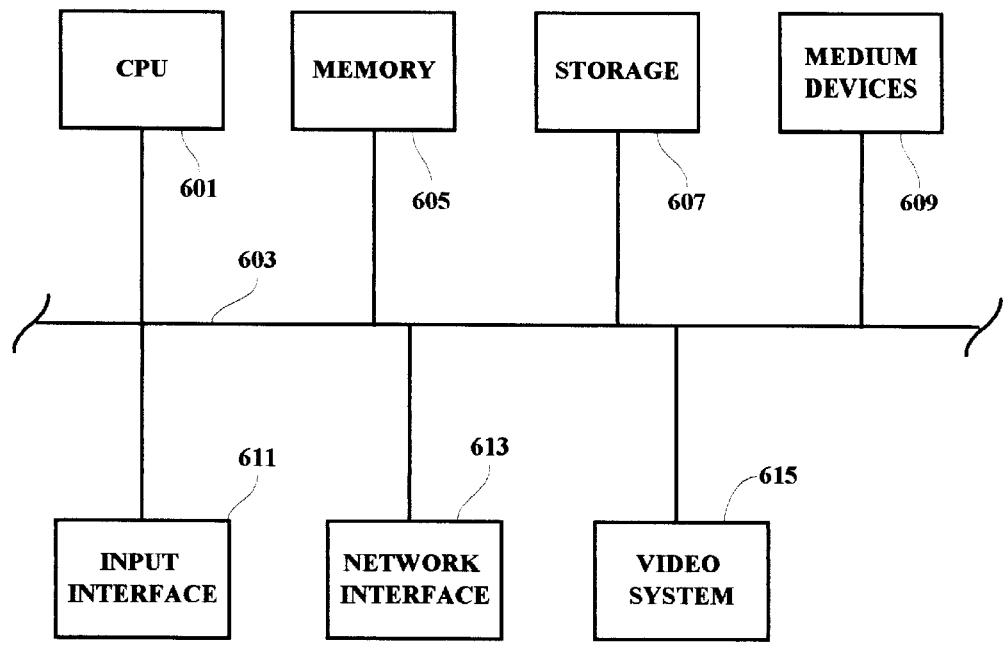
FIG. 6 is an exemplary block diagram of several of the major components of a computer system.

In FIG. 6, there is shown several of the major electronic subsystems which are included in an exemplary embodiment of either or both the server system of the sender 11, the receiver 15 or the computer system of the requester A 29. As shown, a processor 601 is coupled to a system bus 603 which may be any host system bus. It is noted that the processing methodology disclosed herein will apply to many different bus and/or network configurations although only one example is illustrated. A memory subsystem 605, a storage device 607 and selected medium devices 609 such as a diskette drive or a CD drive, are also shown connected to the system bus 603. The information processing circuitry illustrated in FIG. 6 is arranged to establish a communication link and initiate communication with other processing systems and websites. The system, for example, may be connected through a network interface connection 613 to any appropriate network including the Internet, or to a gateway computer for connection to the Internet and selected websites which contain useful information for access. The exemplary system also includes an input interface 611 to enable administrator input to the server system, and also a video system for display of various aspects of the designated transactions, including the sender's database information (FIG. 3) at the various site locations.

Figure 7:
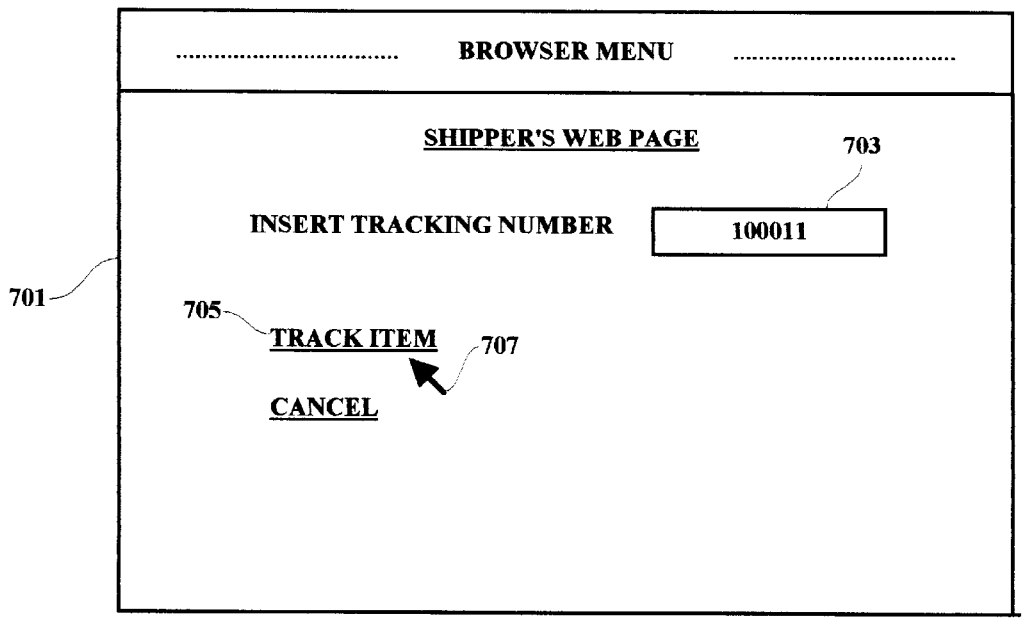
FIG. 7 is an exemplary illustration of a sender's tracking page which may be accessed in tracking items shipped in accordance with the present invention.

FIG. 7 is an illustration of an exemplary sender's tracking page 701 which may be accessed through interconnection network 33 by a requester in tracking items shipped in accordance with the present invention. As shown, in addition to the normal browser format and menu, the display contains a block 703 into which a requester may insert the tracking number of the article being shipped. This number may be made known to interested parties including the receiver 15 and the requester A 29, when it is input to the sender's database when the item is packaged and shipped. After a requester inputs the tracking number 703, the requester may elect to cancel the query or to continue the query by pointing and clicking the pointer 707 on the hypertext "TRACK ITEM" 705 for example. At that time, the sender's server will initiate a process as set forth in flowchart form in FIG. 8.

Figure 8:
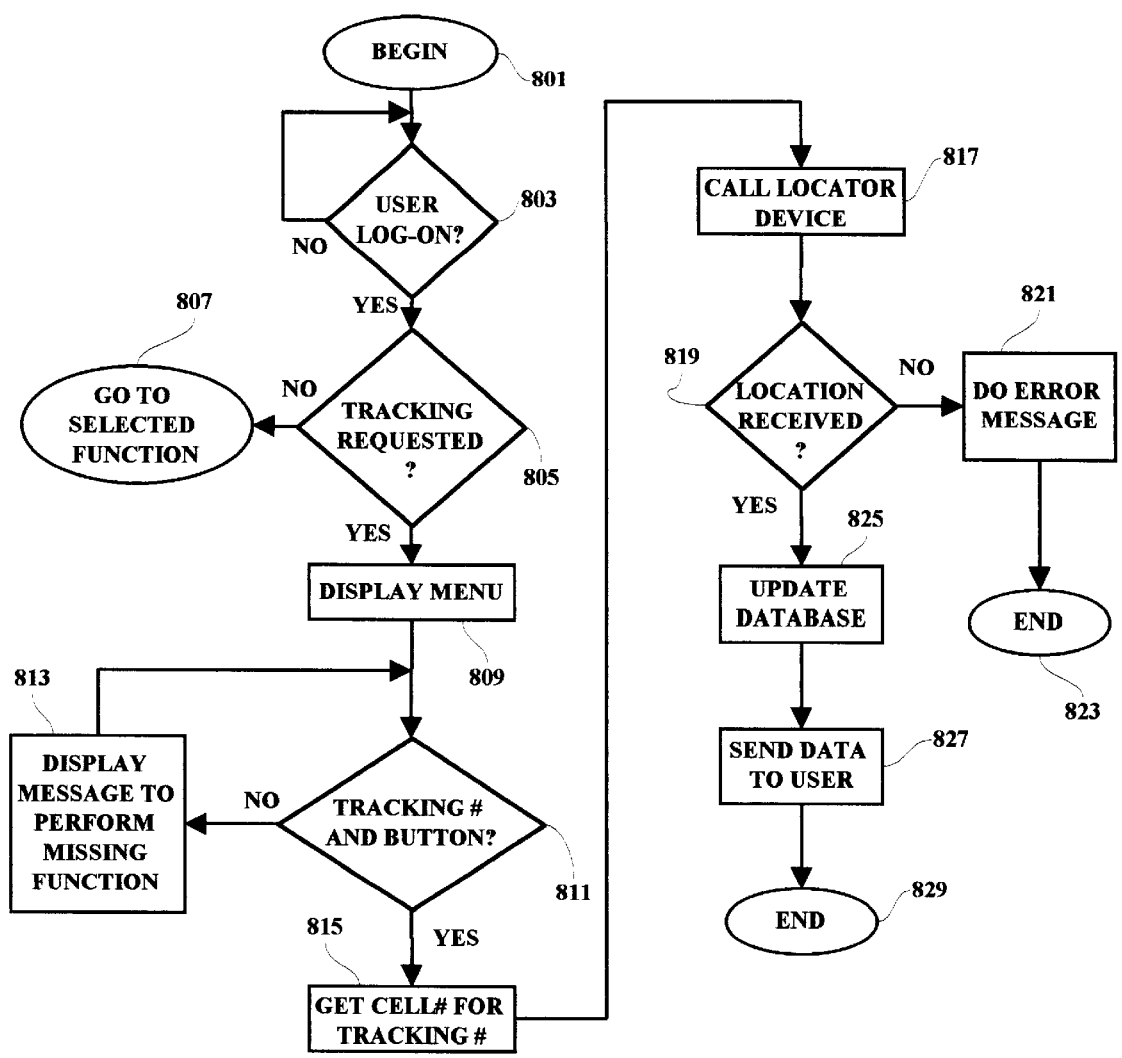
FIG. 8 is a flow chart illustrating an exemplary operational sequence which may be implemented in accordance with the present invention.

As shown in FIG. 8, the tracking process begins 801 when a user or requester log-on is detected 803. It is contemplated that the user may have other options from which to select at the sender's website, however when tracking is requested 805, the appropriate menu is displayed 809 to the user to input additional details such as the tracking number. If an option other than tracking is selected, then the program goes to perform the selected option 807. If, after a predetermined time, the requester has not entered the necessary information for tracking, the requester may be prompted to input the necessary information 813. After selected tracking information is input and the tracking command is received 811, the sender's server gets 815 the appropriate cell phone number for the identified tracking number from the sender's database, and calls 817 the locator device 100 within the identified item 13 that is in transit. The location information is returned as noted above, and when the location is received 819 by the sender's server, the sender's database is updated 825 and the location information is sent to or otherwise made available to the user or requester 827 as the process ends 829. The location information may be sent as a text phone message to the requester's wireless phone or simply made available on the sender's website for access by the requester through the requester's personal computer or other wireless device. If after a predetermined time, the location information is not received by the sender's server, an error message may be caused to be communicated to the requester 821 in any of the above noted ways, and the process will terminate 823. After the item being shipped is received at the receiver site 15, the database is updated to indicate that the corresponding locator device is available for use in connection with another shipment. The locator device may be used in a subsequent shipment that originates at the receiver site or the locator device may be returned to the sender site for use in another shipment from the sender site. The database is updated continuously to maintain a record of where the locator device is at any given time and whether or not it is associated with any particular shipment at any particular time.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for determining location of an item being shipped from a sender to a receiver, said method comprising:

providing a container for receiving said item, said container being arranged with a receptacle for receiving a locator device;

placing said locator device in said receptacle, said locator device including wireless telephone circuitry coupled to a position detecting device; and placing a call to said wireless telephone circuitry, said wireless telephone circuitry being responsive to a receipt of said call for returning signals representative of a position of said container as determined by said locating device.

2. The method as set forth in claim 1 wherein said receptacle is a compartment inside of said container.

3. The method as set forth in claim 1 wherein said receptacle is portable, said receptacle being selectively detachable from said container.

4. The method as set forth in claim 1 and further including returning said locator device to said sender after said container arrives at said receiver, said method further including maintaining a database of positions of said container as transmitted from said locator device to said sender.

5. A method for determining location of an item being shipped from a sender to a receiver, said method comprising:

coupling a locator device to said item, said locator device including wireless telephone circuitry coupled to a position detecting device, said locator device being selectively operable for determining a location of said item, said wireless telephone circuitry being responsive to a receipt of a telephone call for returning signals representative of said location of said item as determined by said locating device; and enabling a requester to access a sender computer system, said sender computer system being selectively operable to provide a said location of said item to said requester.

6. The method as set forth in claim 5 wherein said location is provided in response to an input from said requester.

7. The method as set forth in claim 6 wherein said sender computer system is operable in response to said input to communicate with said locator device to determine a current location of said item, said locator device being further operable for transmitting said current location to said sender computer system.

8. The method as set forth in claim 6 wherein said sender computer system includes a location database, said location database being periodically updated by said locator device with information concerning a location of said item, said sender computer system being operable in response to, said input to access said database to provide a recent location of said item to said requester.

9. The method as set forth in claim 8 wherein a copy of said location database is maintained at an alternate computer site remote from said sender, said requester being enabled to make said input to said alternate computer site.

10. The method as set forth in claim 8 wherein said location database includes a series of locations corresponding to a sequence of points along a route traveled by said item from said sender to said receiver.

11. The method as set forth in claim 10 wherein said location database includes a series of times corresponding to times when said sequential points were determined.

12. The method as set forth in claim 10 wherein said location database further includes a tracking reference indicium corresponding to each of a plurality of items being shipped, said location database further including a phone number for said wireless telephone circuitry for each of said tracking reference indicia.

13. The method as set forth in claim 12 wherein said requester is given access to only said tracking number.

14. The method as set forth in claim 12 wherein said requester is given access to said phone number after inputting an appropriate tracking number.

15. The method as set forth in claim 5 wherein said sender computer system comprises a server, said requester being enabled to access said server through a wireless device.

16. The method as set forth in claim 15 wherein said requester is enabled to access said server through a network connection.

17. The method as set forth in claim 16 wherein said network connection is an Internet connection.

18. The method as set forth in claim 5 wherein said sender computer system comprises a server, said requester being enabled to access said server through a personal computer system.

19. The method as set forth in claim 18 wherein said requester is enabled to access said server through a network connection.

20. The method as set forth in claim 19 wherein said network connection is an Internet connection.

21. The method as set forth in claim 1 wherein said locator device is arranged to determine a position of said locator device relative to a global satellite system.

22. The method as set forth in claim 1 wherein said locator device is arranged to determine a position of said locator device relative to a network of cellular telephone stations covering a predetermined geographical area.

23. A storage medium including machine readable coded indicia, said storage medium being selectively coupled through a reading device to processing circuitry within a computing system, said reading device being selectively operable to read said machine readable coded indicia and provide program signals representative thereof, said program signals being effective to process a determination of location of an item being shipped from a sender to a receiver, wherein said item being shipped is coupled to a locator device, said locator device being capable of determining and selectively transmitting a location of said locator device to said computing system, said program signals being selectively operable for:

enabling a requester to access said computer system;

providing a requester interface to said computer system to enable said requester to provide input to said computer system; and responding to said input to provide a location of said locator device to said requester, said program signals being further effective for maintaining a database containing a sequence of positions through which said item has passed along a route traveled by said item, and enabling an updating of said database when said item has arrived at said receiver and when said locator device is returned to said sender.

24. A processing system at a sender site, said processing system including a system bus, a processor, a memory system, and a network interface, all coupled to said system bus, said processing system being operable in response to an input from a requester for providing a location of an item being shipped from said sender to a receiver, said processing system being selectively operable for maintaining a database containing a sequence of positions through which said item has passed along a route traveled by said item, said processing system being further selectively operable for enabling an updating of said database when said item has arrived at said receiver and also when said locator device is returned to said sender.

* * * * *